(12) United States Patent
Cai

(10) Patent No.: US 11,870,733 B1
(45) Date of Patent: Jan. 9, 2024

(54) DYNAMICALLY DEACTIVATING AND REACTIVATING CELL SITES BASED ON A RADAR SIGNAL ALERT BROADCAST

(71) Applicant: T-MOBILE INNOVATIONS LLC, Overland Park, KS (US)

(72) Inventor: Zheng Cai, Fairfax, VA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 248 days.

(21) Appl. No.: 17/340,657

(22) Filed: Jun. 7, 2021

(51) Int. Cl.
*H04L 5/00* (2006.01)
*H04W 28/02* (2009.01)

(52) U.S. Cl.
CPC ....... *H04L 5/0098* (2013.01); *H04W 28/0205* (2013.01); *H04W 28/0247* (2013.01)

(58) Field of Classification Search
CPC ............ H04L 5/0098; H04W 28/0205; H04W 28/0247
See application file for complete search history.

(56) References Cited

U.S. PATENT DOCUMENTS

| 10,554,236 B1* | 2/2020 | Rausch ................. H04B 15/04 |
| 2017/0195887 A1 | 7/2017 | Jovancevic |
| 2017/0311171 A1 | 10/2017 | Kurian et al. |
| 2018/0199342 A1* | 7/2018 | Rai ........................ H04K 3/226 |

FOREIGN PATENT DOCUMENTS

WO    WO-2016070607 A1 *  5/2016

* cited by examiner

*Primary Examiner* — Khoa Huynh
(74) *Attorney, Agent, or Firm* — SHOOK, HARDY & BACON L.L.P.

(57) ABSTRACT

Methods are provided for dynamically deactivating and reactivating a radio at a particular cell site based on a detected radar signal. When a cell site detects a radar signal, it sends a radar signal alert (RSA) broadcast to its neighboring cells in the direction the radar signal is traveling. The cell site receiving the RSA broadcast is able to determine, based on locations and time stamps of two or more cell sites providing the RSA broadcast, the direction the radar is sweeping, the speed of the radar signal, and the time the radar signal will reach its site. Based on this determination, the cell site can determine the appropriate time to shutoff the Band 41 radio as well as the appropriate time to power on the Band 41 radio. Moreover, the cell site may initially reduce power to the Band 41 radio to reduce the shutoff time.

20 Claims, 4 Drawing Sheets

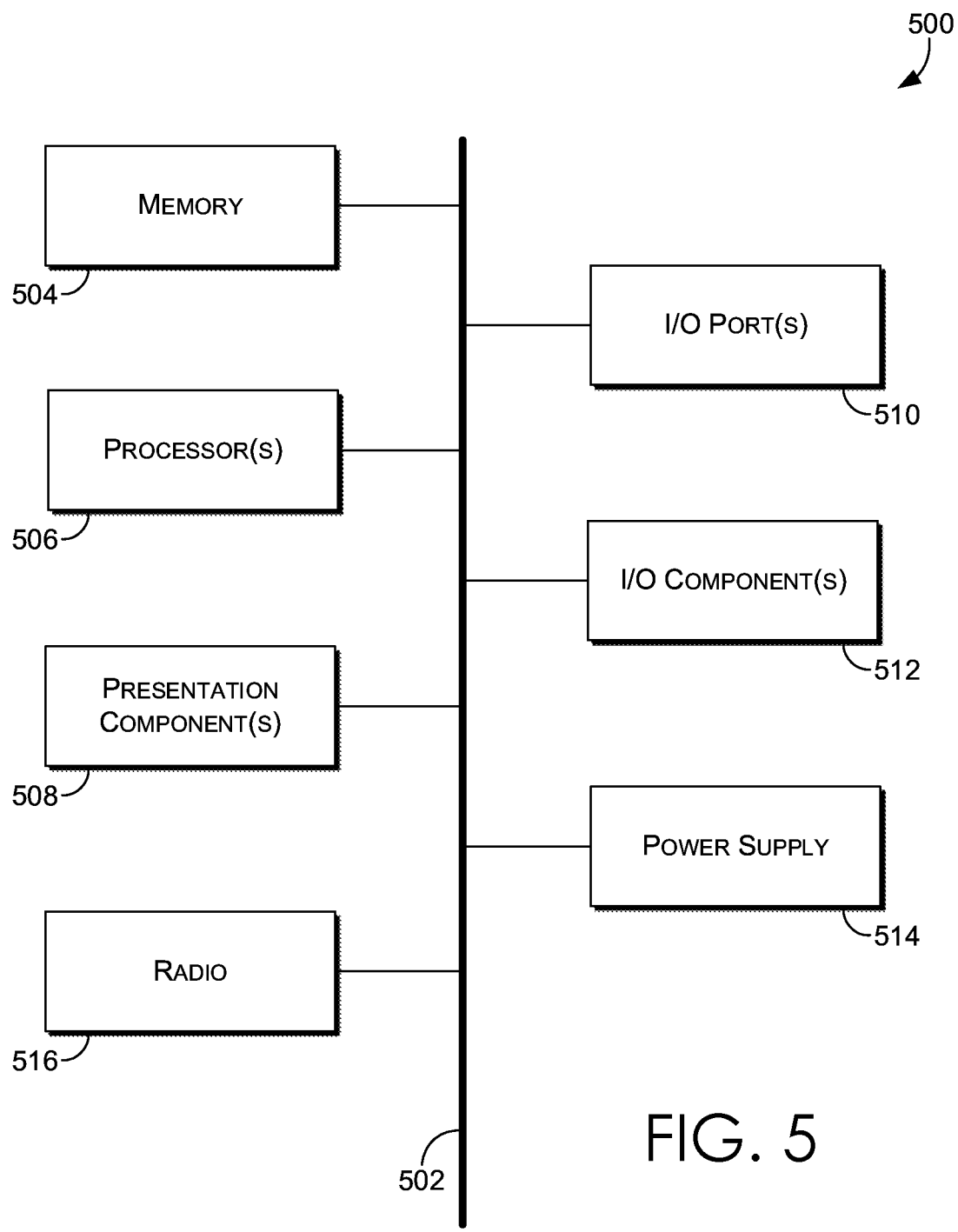

DYNAMICALLY DEACTIVATING AND REACTIVATING CELL SITES BASED ON A RADAR SIGNAL ALERT BROADCAST

SUMMARY

A high-level overview of various aspects of the invention are provided here for that reason, to provide an overview of the disclosure and to introduce a selection of concepts that are further described in the detailed-description section below. This summary is not intended to identify key features or essential features of the claimed subject matter, nor is it intended to be used as an aid in isolation to determine the scope of the claimed subject matter.

In brief and at a high level, aspects are provided for dynamically deactivating and reactivating cell sites based on a radar signal alert (RSA) broadcast. More particularly, aspects are provided for reducing Band 41 radio shutdown time when radar interference is imminent. To do so, a first RSA broadcast is initially detected at a first cell site from a second cell site. The first RSA broadcast indicates the second cell site has detected a radar signal. In some aspects, a second RSA broadcast is received from a third cell site and confirms the detected radar signal. Upon receiving the RSA broadcast, a time the radar signal will be within range of the first cell site may be determined. At the determined time, the first cell site can be dynamically deactivated.

In some aspects, prior to dynamically deactivating the first cell site, transmitting power may be reduced at the first cell site. A second time the radar signal will no longer be within range of the first cell site may be determined. At the determined second time, the first cell site may be dynamically reactivated.

BRIEF DESCRIPTION OF THE SEVERAL VIEWS OF THE DRAWINGS

Illustrative embodiments of the present invention are described in detail below with reference to the attached drawing figures, and wherein:

FIG. 5 depicts an exemplary computing device suitable for use in implementations of aspects herein.

DETAILED DESCRIPTION

Figure 1:
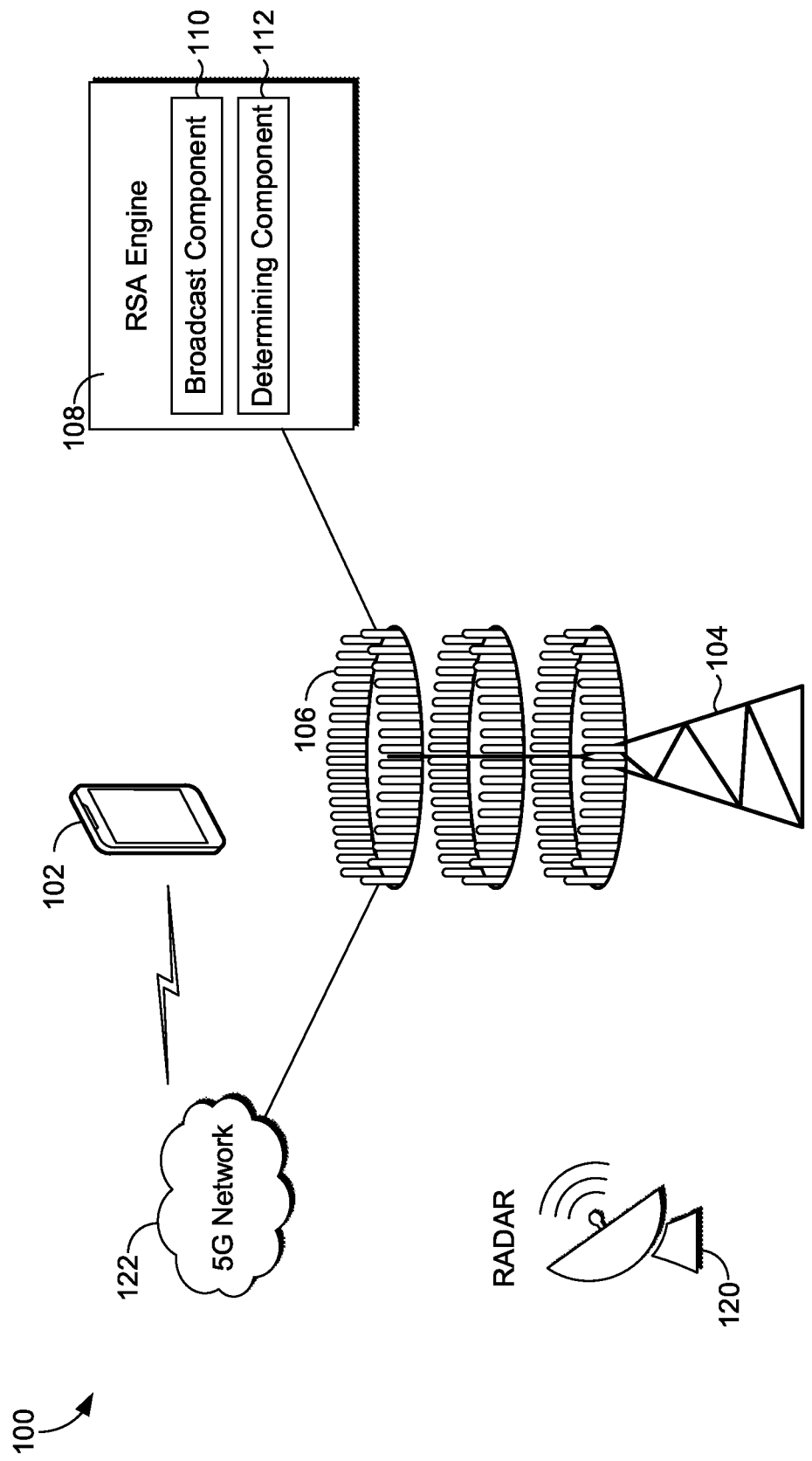
FIG. 1 depicts an example of a network environment in accordance with one or more embodiments.

The subject matter of select embodiments of aspects herein is described with specificity herein to meet statutory requirements. But the description itself is not intended to define what we regard as our invention, which is what the claims do. The claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of aspects herein.

Embodiments herein may be embodied as, among other things: a method, system, or set of instructions embodied on one or more computer-readable media. Computer-readable media include both volatile and nonvolatile media, removable and nonremovable media, and contemplate media readable by a database, a switch, and various other network devices. Computer-readable media includes media implemented in any way for storing information. Examples of stored information include computer-useable instructions, data structures, program modules, and other data representations. Media examples include RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently. Embodiments may take the form of a hardware embodiment, or an embodiment combining software and hardware. Some embodiments may take the form of a computer-program product that includes computer-useable or computer-executable instructions embodied on one or more computer-readable media.

"Computer-readable media" can be any available media and may include volatile and nonvolatile media, as well as removable and non-removable media. By way of example, and not limitation, computer-readable media may include computer storage media and communication media.

"Computer storage media" may include, without limitation, volatile and nonvolatile media, as well as removable and non-removable media, implemented in any method or technology for storage of information, such as computer-readable instructions, data structures, program modules, or other data. In this regard, computer storage media may include, but is not limited to, Random Access Memory (RAM), Read-Only Memory (ROM), Electrically Erasable Programmable Read-Only Memory (EEPROM), flash memory or other memory technology, CD-ROM, digital versatile disks (DVDs) or other optical disk storage, magnetic cassettes, magnetic tape, magnetic disk storage, or other magnetic storage devices, or any other medium which can be used to store the desired information and which may be accessed by the computing device 500 shown in FIG. 5. Computer storage media does not comprise a signal per se.

"Communication media" may include, without limitation, computer-readable instructions, data structures, program modules, or other data in a modulated data signal, such as a carrier wave or other transport mechanism, and may include any information delivery media. As used herein, the term "modulated data signal" refers to a signal that has one or more of its attributes set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of any of the above also may be included within the scope of computer-readable media.

A "network" refers to a network comprised of wireless and wired components that provide wireless communications service coverage to one or more UE. The network may comprise one or more base stations, one or more cell sites (i.e., managed by a base station), one or more cell towers (i.e., having an antenna) associated with each base station or cell site, a gateway, a backhaul server that connects two or more base stations, a database, a power supply, sensors, and other components not discussed herein, in various embodiments.

The terms "base station" and "cell site" may be used interchangeably herein to refer to a defined wireless communications coverage area (i.e., a geographic area) serviced by a base station. It will be understood that one base station may control one cell site or alternatively, one base station may control multiple cell sites. As discussed herein, a base station is deployed in the network to control and facilitate, via one or more antenna arrays, the broadcast, transmission, synchronization, and receipt of one or more wireless signals in order to communicate with, verify, authenticate, and provide wireless communications service coverage to one or more UE that request to join and/or are connected to a network.

An "access point" may refer to hardware, software, devices, or other components at a base station, cell site, and/or cell tower having an antenna, an antenna array, a radio, a transceiver, and/or a controller. Generally, an access point may communicate directly with user equipment according to one or more access technologies (e.g., 3G, 4G, LTE, 5G, mMIMO) as discussed hereinafter.

A "band" is a specific frequency that a carriers utilizes to provide network coverage to its subscribers, enabling user devices corresponding to the subscribers to communicate with the particular network. An "adjacent band" refers to a band having a frequency range that is adjacent to the frequency range of the band.

The terms "user equipment," "UE," and "user device" are used interchangeably to refer to a device employed by an end-user that communicates using a network. UE generally includes one or more antenna coupled to a radio for exchanging (e.g., transmitting and receiving) transmissions with a nearby base station, via an antenna array of the base station. In embodiments, UE may take on any variety of devices, such as a personal computer, a laptop computer, a tablet, a netbook, a mobile phone, a smart phone, a personal digital assistant, a wearable device, a fitness tracker, or any other device capable of communicating using one or more resources of the network. UE may include components such as software and hardware, a processor, a memory, a display component, a power supply or power source, a speaker, a touch-input component, a keyboard, and the like. In embodiments, some of the UE discussed herein may include current UE capable of using 5G and having backward compatibility with prior access technologies, current UE capable of using 5G and lacking backward compatibility with prior access technologies, and legacy UE that is not capable of using 5G.

The terms "radio," "controller," "antenna," and "antenna array" are used interchangeably to refer to one or more software and hardware components that facilitate sending and receiving wireless radio-frequency signals, for example, based on instructions from a base station. A radio may be used to initiate and generate information that is then sent out through the antenna array, for example, where the radio and antenna array may be connected by one or more physical paths. Generally an antenna array comprises a plurality of individual antenna elements. The antennas discussed herein may be dipole antennas, having a length, for example, of ¼, ½, 1, or 1½ wavelength. The antennas may be monopole, loop, parabolic, traveling-wave, aperture, yagi-uda, conical spiral, helical, conical, radomes, horn, and/or apertures, or any combination thereof. The antennas may be capable of sending and receiving transmission via FD-MIMO, Massive MIMO, 3G, 4G, 5G, and/or 802.11 protocols and techniques.

Additionally, it will be understood that terms such as "first," "second," and "third" are used herein for the purposes of clarity in distinguishing between elements or features, but the terms are not used herein to import, imply, or otherwise limit the relevance, importance, quantity, technological functions, sequence, order, and/or operations of any element or feature unless specifically and explicitly stated as such.

As additional technologies are introduced into wireless communications, the potential for interference between adjacent bands increases. For example, band 41 spectrum, utilized to provide 5G services, is adjacent to radar frequencies utilized in Federal Aviation Administration (FAA) radars, Next-Generation Radar (NEXRAD), and the like. If a band 41 radio is in close proximity with a radar signal, interference may occur in both systems.

To illustrate, assume a particular cell site includes a band 41 radio and is near an airport. It is common for airports to utilize surveillance radar to verify location of aircraft, identify objects in the air space, and avoid collisions. Airports also utilize similar radar systems to monitor weather conditions. The radar systems are typically mounted on a continually rotating antenna mounted on a tower. As the antenna rotates, the radar signal sweeps in the direction of the antenna. Interference occurs when the radar signal sweeps across the area covered by the band 41 radio signal. This can result in dropped calls for user devices receiving a signal from the cell site or worse, failure to avoid collisions or detect severe weather conditions.

Aspects herein provide for dynamically deactivating and reactivating a band 41 radio at a particular cell site based on a detected radar signal. For example, when a cell site detects a radar signal, it sends a radar signal alert (RSA) broadcast to its neighboring cells in the direction the radar signal is traveling. In some aspects, a RSA broadcast is confirmed after a second cell site detects the radar signal. The RSA broadcast may include information such as cell site location information, the direction the radar is sweeping, the speed of the radar signal, time stamps corresponding to the time each cell site detected the radar signal, and the like.

In some aspects, the cell site receiving the RSA broadcast is able to determine, based on locations and time stamps of two or more cell sites providing the RSA broadcast, the direction the radar is sweeping, the speed of the radar signal, and the time the radar signal will reach its site. Based on this determination, the cell site can determine the appropriate time to shutoff the Band 41 radio as well as the appropriate time to power on the Band 41 radio. In some aspects, the cell site can initially reduce power to the Band 41 radio to reduce the shutoff time.

In one aspect, a method is provided for dynamically deactivating and reactivating cell sites based on a RSA broadcast. The method comprises receiving, at a first cell site, a first RSA broadcast from a second cell site. The first RSA broadcast indicates the second cell site has detected a radar signal. The method also comprises, upon receiving, at the first cell site, a second RSA broadcast from a third cell site confirming the detected radar signal, determining a first time the radar signal will be within range of the first cell site.

The method further comprises at the determined first time, dynamically deactivating the first cell site.

In another aspect, computer-readable storage media having computer-executable instructions embodied thereon is provided that, when executed by one or more processors, cause the processors to perform a method. The method comprises receiving, at a first cell site, a first RSA broadcast from a second cell site. The first RSA broadcast indicates the second cell site has detected a radar signal. The method also comprises, upon receiving the first RSA broadcast at the first cell site, determining a first time the radar signal will be within range of the first cell site. The method further comprises, at the determined first time, dynamically deactivating the first cell site.

In yet another aspect, a system for dynamically deactivating and reactivating cell sites based on a RSA broadcast is provided. The system comprises a first cell site comprising a first plurality of antennas a second cell site comprising a second plurality of antennas and a sensor that detects radar signals. At least one antenna of the first plurality of antennas provides Band 41 spectrum. The first cell site, upon receiving a first RSA broadcast from a second cell site indicating the second cell site has detected a radar signal, determines a first time the radar signal will be within range of the first cell site. At the determined first time, the first cell site is dynamically deactivated.

Turning to FIG. 1, a network environment suitable for use in implementing embodiments of the present disclosure is provided. Such a network environment is illustrated and designated generally as network environment 100. Network environment 100 is but one example of a suitable network environment and is not intended to suggest any limitation as to the scope of use or functionality of the disclosure. Neither should the network environment 100 be interpreted as having any dependency or requirement relating to any one or combination of components illustrated.

As previously mentioned, embodiments of the present invention are directed to dynamically deactivating and reactivating cell sites based on a RSA broadcast. A network cell may comprise a base station to facilitate wireless communication between a communications device within the network cell, such as communications device 500 described with respect to FIG. 5, and a network. As shown in FIG. 1, a communications device may be a UE 102. In the network environment 100, UE 102 may communicate with other devices, such as mobile devices, servers, etc. The UE 102 may take on a variety of forms, such as a personal computer, a laptop computer, a tablet, a netbook, a mobile phone, a Smart phone, a personal digital assistant, or any other device capable of communicating with outer devices. For example, the UE 102 may take on any form such as, for example, a mobile device or any other computing device capable of wirelessly communication with the other devices using a network. Makers of illustrative devices include, for example, Research in Motion, Creative Technologies Corp., Samsung, Apple Computer, and the like. A device can include, for example, a display(s), a power source(s) (e.g., a battery), a data store(s), a speaker(s), memory, a buffer(s), and the like. In embodiments, UE 102 comprises a wireless or mobile device with which a wireless telecommunication network(s) can be utilized for communication (e.g., voice and/or data communication). In this regard, the UE 102 can be any mobile computing device that communicates by way of, for example, a 5G network.

The UE 102 may utilize network 122 to communicate with other computing devices (e.g., mobile device(s), a server(s), a personal computer(s), etc.). In embodiments, network 122 is a telecommunications network, or a portion thereof. A telecommunications network might include an array of devices or components, some of which are not shown so as to not obscure more relevant aspects of the invention. Components such as terminals, links, and nodes (as well as other components) may provide connectivity in some embodiments. Network 122 may include multiple networks, as well as being a network of networks, but is shown in more simple form so as to not obscure other aspects of the present disclosure. Network 122 may be part of a telecommunications network that connects subscribers to their immediate service provider. In embodiments, network 122 is associated with a telecommunications provider that provides services to user devices, such as UE 102. For example, network 122 may provide voice services to user devices or corresponding users that are registered or subscribed to utilize the services provided by a telecommunications provider. Although it is contemplated network 122 can be any communication network providing voice and/or data service(s), such as, for example, a 1×circuit voice, a 3G network (e.g., CDMA, CDMA1000, WCDMA, GSM, UMTS), a 4G network (WiMAX, LTE, HSDPA), or the like, network 122 is depicted in FIG. 1 as a 5G network.

The network environment 100 may include a database (not shown). The database may be similar to the memory component 504 in FIG. 5 and can be any type of medium that is capable of storing information. The database can be any collection of records (e.g., network or device information). In one embodiment, the database includes a set of embodied computer-executable instructions that, when executed, facilitate various aspects disclosed herein. These embodied instructions will variously be referred to as "instructions" or an "application" for short.

As previously mentioned, the UE 102 may communicate with other devices by using a base station, such as base station 104. In embodiments, base station 104 is a wireless communications station that is installed at a fixed location, such as at a radio tower, as illustrated in FIG. 1. The radio tower may be a tall structure designed to support one or more antennas 106 for telecommunications and/or broadcasting. In other embodiments, base station 104 is a mobile base station. The base station 104 may be an MMU and include a gNodeB for 5G communications via network 122. In this way, the base station 104 can facilitate wireless communication between UE 102 and network 122.

As stated, the base station 104 may include a radio (not shown) or a remote radio head (RRH) that generally communicates with one or more antennas associated with the base station 104. In this regard, the radio is used to transmit signals or data to an antenna 106 associated with the base station 104 and receive signals or data from the antenna 106. Communications between the radio and the antenna 106 can occur using any number of physical paths. A physical path, as used herein, refers to a path used for transmitting signals or data. As such, a physical path may be referred to as a radio frequency (RF) path, a coaxial cable path, cable path, or the like.

The antenna 106 is used for telecommunications. Generally, the antenna 106 may be an electrical device that converts electric power into radio waves and converts radio waves into electric power. The antenna 106 is typically positioned at or near the top of the radio tower as illustrated in FIG. 1. Such an installation location, however, is not intended to limit the scope of embodiments of the present invention. The radio associated with the base station 104 may include at least one transceiver configured to receive and transmit signals or data.

Continuing, the network environment 100 may further include an RSA engine 108. The RSA engine 108 may be configured to, among other things, dynamically deactivate and reactivate cell sites based on a RSA broadcast, in accordance with the present disclosure. Though RSA engine 108 is illustrated as a component of base station 104 in FIG. 1, it may be a standalone device (e.g., a server having one or more processors), a service provided via the 5G network 122, or may be remotely located. Moreover, although not depicted in FIG. 1, the radar detecting sensor that initially detects a radar signal on behalf of a cell site may be integrated into the RSA engine 108, an antenna 106 of a plurality of antennas, or may be a standalone device or antenna on or near base station 104.

As mentioned, the RSA engine 108 may facilitate dynamically deactivating and reactivating cell sites based on a RSA broadcast, such as base station 104. The RSA engine 108 may include, among other things, a broadcast component 110 and a determining component 112. The RSA engine 108 may receive an indication that a radar signal has been detected. As mentioned, the radar signal may be detected by a sensor integrated into the RSA engine 108, an antenna 106 of a plurality of antennas, or a standalone sensor on or near base station 104.

Once the radar signal is detected at a second cell site, broadcast component 110 may communicate a RSA broadcast to neighboring cells (e.g., a first cell site) in the direction the radar is sweeping. Additionally, the RSA broadcast may include a sweeping pattern of the radar signal, a speed of the radar signal, and a time stamp corresponding to detection of the radar signal. Based on a location of the second cell site (or third cell site, in some aspects), the time the radar signal will be within range of the first cell site can be determined.

Upon receiving, at the first cell site, the RSA broadcast from the second cell site initially detecting the radar signal, a determining component 112 of an RSA engine 108 at the first cell site may determine a time the radar signal will be within range of the first cell site. At the determined time, RSA engine 108 at the first cell site dynamically deactivates the first cell site (although described herein with respect to deactivating and reactivating cell sites, it is contemplated and within the scope of this disclosure that the RSA engine 108 can dynamically deactivate and reactivate individual antennas of the plurality of antennas corresponding to a cell site). In aspects, prior to dynamically deactivating the first cell site, transmitting power is initially reduced at the first cell site.

In some aspects, a third cell site, after detecting the radar signal, communicates a second RSA broadcast to the first cell site confirming the detected signal. Accordingly, the RSA engine 108 at the first cell site may not determine the time the radar signal will be within range of the first cell site until the confirmation RSA broadcast is received.

A time is determined, in some aspects, when the radar signal will no longer be within range of the first cell site. At the determined time, the RSA engine 108 dynamically reactivates the first cell site. As described above with respect to the time may be determined using the information contained in the RSA broadcast and a location of the cell site(s) communicating the RSA broadcast.

Having described the network environment 100 and components operating therein, it will be understood by those of ordinary skill in the art that the network environment 100 is but one example of a suitable network and is not intended to limit the scope of use or functionality of aspects described herein. Similarly, the network environment 100 should not be interpreted as imputing any dependency and/or any requirements with regard to each component and combination(s) of components illustrated in FIG. 1. It will be appreciated by those of ordinary skill in the art that the number, interactions, and physical location of components illustrated in FIG. 1 are examples, as other methods, hardware, software, components, and devices for establishing one or more communication links between the various components may be utilized in implementations of the present invention. It will be understood to those of ordinary skill in the art that the components may be connected in various manners, hardwired or wireless, and may use intermediary components that have been omitted or not included in FIG. 1 for simplicity's sake. As such, the absence of components from FIG. 1 should not be interpreted as limiting the present invention to exclude additional components and combination(s) of components. Moreover, though components may be represented as singular components or may be represented in a particular quantity in FIG. 1, it will be appreciated that some aspects may include a plurality of devices and/or components such that FIG. 1 should not be considered as limiting the quantity of any device and/or component.

Figure 2:
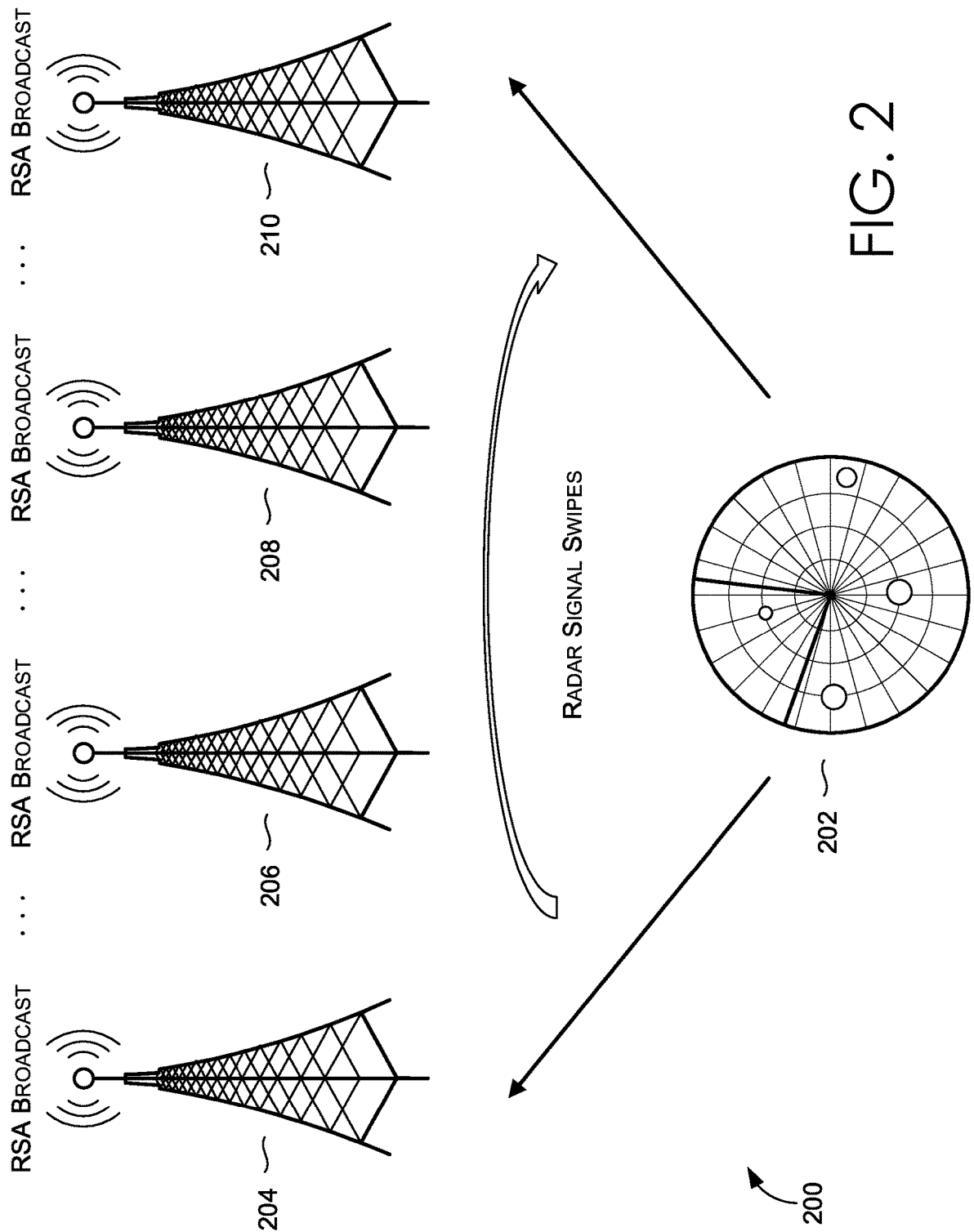
FIG. 2 depicts a diagram of an example operating environment illustrating dynamically deactivating and reactivating cell sites based on a radar signal alert broadcast, in accordance with aspects herein.

In FIG. 2, a diagram of example operating environment 200 illustrating dynamic cell site deactivation and reactivation is depicted. For illustrative purposes only, FIG. 2 provides an example of a system comprising a plurality of cell sites, 204, 206, 208, 210. In operating environment 200, a radar 202 is also depicted. As described herein, as the radar sweeps across an area where service is provided by cell sites 204, 206, 208, 210, interference may occur. Accordingly, suppose cell site 204 initially detects a radar signal from radar 202. Cell site 204 may communicate an RSA broadcast to cell sites 206, 208, 210. As the radar continues to sweep, cell site 206 may also detect the radar signal from radar 202. Cell site 206 may also communicate an RSA broadcast in the direction of the radar sweep or, as illustrate, to cell sites 208, 210.

As described herein, cell sites 206, 208, 210 may take action after receiving a single RSA broadcast from cell site 204, or after receiving a second or a confirmation RSA broadcast from cell site 206. In either case, cell sites 206, 208, 210 can individually determine a time the radar signal will be within its range. For example, a sweeping pattern and a speed of the radar signal may be identified. Moreover, the RSA broadcast may include a time stamp corresponding to detection of the radar signal by cell site 206 (or cell site 208).

Based on a location of the cell site receiving the RSA broadcast and a location of the cell site(s) communicating the RSA broadcast, the time the radar signal will be within range as well as a time the radar signal will no longer be within range of the cell site receiving the RSA broadcast may be determined. At the determined time, each respective cell site 206, 208, 210 is dynamically deactivated. In some aspects, prior to being dynamically deactivated, transmitting power may initially be reduced at reach respective cell site 206, 208, 210.

In some aspects, a second time the radar signal will no longer be within range of each cell 206, 208, 210 may be determined. At the second time, each respective cell site 206, 208, 210 may be dynamically reactivated.

Figure 3:
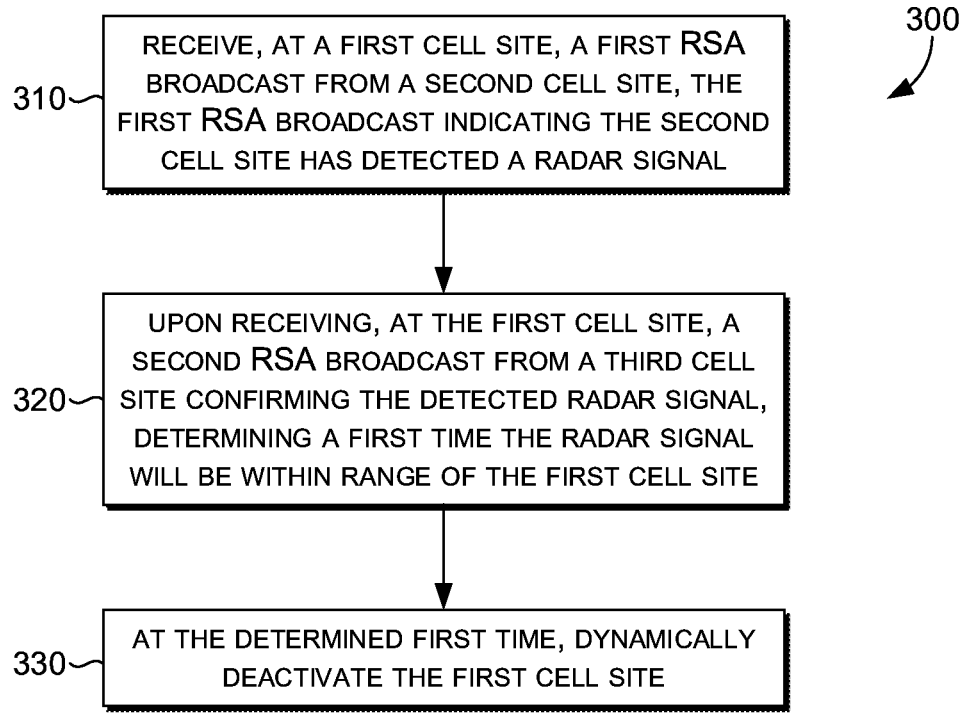
FIG. 3 a flowchart of an exemplary method for dynamically deactivating and reactivating cell sites based on a radar signal alert broadcast, in accordance with aspects herein.

FIG. 3 depicts a flowchart of an exemplary method 300 for dynamically deactivating and reactivating cell sites based on a RSA broadcast, in accordance with aspects herein. At block 310, a first RSA broadcast is received, at a first cell site, from a second cell site. The first RSA broadcast indicates the second cell site has detected a radar signal. In aspects, the first cell site provides Band 41 spectrum.

At block 320, a second RSA broadcast is received, at the first cell site, from a third cell site. The second RSA broadcast confirms the detected radar signal. Upon receiving the second RSA broadcast, a first time the radar signal will be within range of the first cell site can be determined.

At the determined first time, the first cell site is dynamically deactivated, at block 330. In some aspects, prior to dynamically deactivating the first cell site, transmitting power is reduced at the first cell site. By initially reducing transmitting power, actual shut down or deactivation time of the first cell site can be reduced.

In some aspects, a second time the radar signal will no longer be within range of the first cell site is determined. At the determined second time, the first cell site may be dynamically reactivated. In aspects, the first time and the second time may be determined by initially identifying a sweeping pattern of the radar signal, a speed of the radar signal, and a time stamp corresponding to detection of the radar signal by each of the second cell site and the third cell site. Based on a location of the second cell site and the third cell site, the first time the radar signal will be within range of the first cell site and the second time the radar signal will no longer be within range of the first cell site can be determined.

Figure 4:
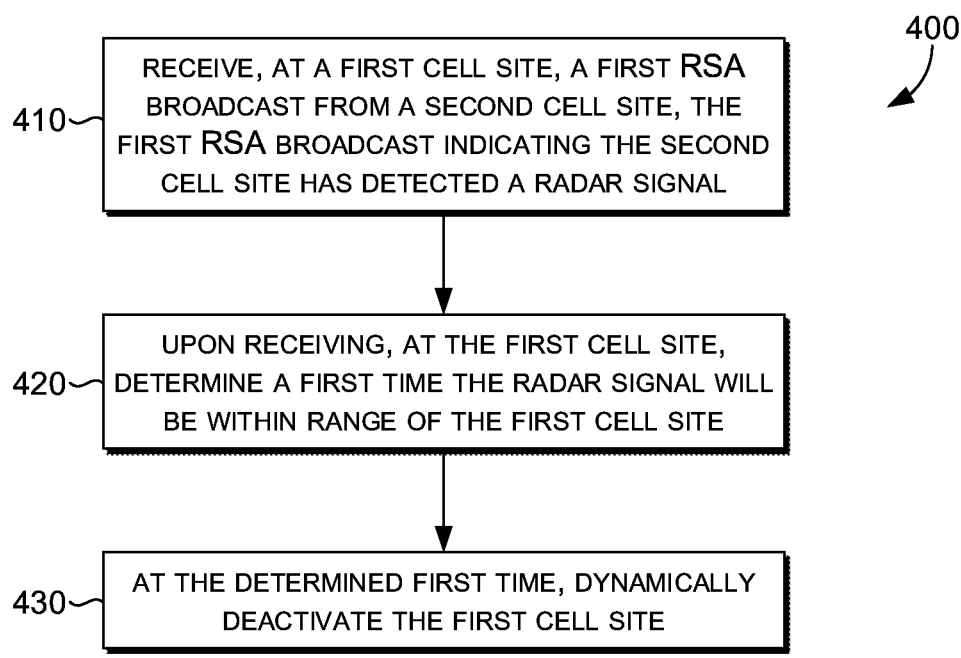
FIG. 4 depicts a flowchart of an exemplary method for dynamically deactivating and reactivating cell sites based on a radar signal alert broadcast, in accordance with aspects herein.

FIG. 4 depicts a flowchart of an exemplary method 400 for dynamically deactivating and reactivating cell sites based on a RSA broadcast, in accordance with aspects herein. At block 410, a first RSA broadcast is received, at a first cell site, from a second cell site. The first RSA broadcast indicates the second cell site has detected a radar signal. In some aspects, a second RSA broadcast is received from a third cell site confirming the detected radar signal.

Upon receiving the RSA broadcast at the first cell site, a first time the radar signal will be within range of the first cell site can be determined, at block 420. At the determined first time, the first cell site can be dynamically deactivated, at block 430. In some aspects, prior to dynamically deactivating the first cell site, transmitting power may be reduced at the first cell site. The first cell site may provide include a radio that provides a signal that is adjacent to radar, such as Band 41 spectrum.

In some aspects, a second time the radar signal will no longer be within range of the first cell site is determined. At the determined second time, the first cell site may be dynamically reactivated. In some aspects, the first time and the second time are determined by identifying a sweeping pattern of the radar signal, a speed of the radar signal, and a time stamp corresponding to detection of the radar signal by the second cell site. Based on a location of the second cell site, the first time the radar signal will be within range of the first cell site and the second time the radar signal will no longer be within range of the first cell site can be determined.

Referring to FIG. 5, a block diagram of an example of a computing device 500 suitable for use in implementations of the technology described herein is provided. In particular, the exemplary computer environment is shown and designated generally as computing device 500. Computing device 500 is but one example of a suitable computing environment and is not intended to suggest any limitation as to the scope of use or functionality of the invention. Neither should computing device 500 be interpreted as having any dependency or requirement relating to any one or combination of components illustrated. In aspects, the computing device 500 may be a base station. In another embodiment, the computing device 500 may be UE capable of two-way wireless communications with an access point. Some non-limiting examples of the computing device 500 include a base station, a controller at a base station, a backhaul server, a personal computer, a cell phone, current UE, legacy UE, a tablet, a pager, a personal electronic device, a wearable electronic device, an activity tracker, a laptop, and the like.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

As shown in FIG. 5, computing device 500 includes a bus 502 that directly or indirectly couples various components together. The bus 502 may directly or indirectly one or more of memory 504, processor(s) 506, presentation component(s) 508 (if applicable), radio(s) 516, input/output (I/O) port(s) 510, input/output (I/O) component(s) 512, power supply 514, and/or transmitter(s) 518. Although the components of FIG. 5 are shown with lines for the sake of clarity, in reality, delineating various components is not so clear, and metaphorically, the lines would more accurately be grey and fuzzy. For example, one may consider a presentation component(s) 508 such as a display device to be one of I/O components 512. Also, the processor(s) 506 may include memory 504, in another example. The present disclosure hereof recognizes that such is the nature of the art, and reiterates that FIG. 5 is merely illustrative of an example of a computing device 500 that can be used in connection with one or more implementations of the present disclosure. Distinction is not made between such categories as "workstation," "server," "laptop," "handheld device," etc., as all are contemplated within the scope of the present disclosure and refer to "computer" or "computing device."

Memory 504 may take the form of memory components described herein. Thus, further elaboration will not be provided here, but it should be noted that memory 504 may include any type of tangible medium that is capable of storing information, such as a database or data store. A database or data store may be any collection of records, files, or information encoded as electronic data and stored in memory 504, for example. In one embodiment, memory 504 may include a set of embodied computer-readable and executable instructions that, when executed, facilitate various functions or elements disclosed herein. These embodied instructions will variously be referred to as "instructions" or an "application" for short.

Processor(s) 506 may be multiple processors that receive instructions and process them accordingly. Presentation component(s) 508, if available, may include a display device, an audio device such as a speaker, and/or other components that may present information through visual (e.g., a display, a screen, a lamp (LED), a graphical user interface (GUI), and/or even lighted keyboards), auditory, and/or other tactile or sensory cues.

Radio(s) 516 represents one or more radios that facilitate communication with a wireless telecommunications network. For example, radio(s) 516 may be connected to one or more antenna elements through a physical path. Illustrative wireless telecommunications technologies include CDMA, GPRS, TDMA, GSM, and the like. Radio(s) 516 might additionally or alternatively facilitate other types of wireless communications including Wi-Fi, WiMAX, 4G, 3G, 4G, LTE, mMIMO, 5G, NR, VoLTE, and/or other VoIP communications. As can be appreciated, in various embodiments, radio(s) 516 can be configured to concurrently support multiple technologies, as previously discussed herein. As such, each of many radio(s) 516 may be used to separately control portions of an antenna array, for example, where at least one portion utilizes a distinct technology relative to another portion in the same antenna array or at the same base station or cell site. A wireless telecommunications network might include an array of devices, which are not shown so as to not obscure more relevant aspects of the invention. Components such as a base station, a communications tower, or even access points (as well as other components) can provide wireless connectivity in some embodiments.

The input/output (I/O) ports 510 may take a variety of forms. Exemplary I/O ports 512 may include a USB jack, a stereo jack, an infrared port, a firewire port, other proprietary communications ports, and the like. Input/output (I/O) components 512 may comprise keyboards, microphones, speakers, touchscreens, and/or any other item usable to directly or indirectly input data into the computing device 500.

Power supply 514 may include batteries, fuel cells, and/or any other component that may act as a power source to supply power to the computing device 500 or to other network components, including through one or more electrical connections or couplings. Power supply 514 may be configured to selectively supply power to different components independently and/or concurrently.

Finally, regarding FIGS. 1 through 5, it will be understood by those of ordinary skill in the art that the environment(s), system(s), and/or methods(s) depicted are not intended to limit the scope of use or functionality of the present embodiments. Similarly, the environment(s), system(s), and/or methods(s) should not be interpreted as imputing any dependency and/or any requirements with regard to each component, each step, and combination(s) of components or step(s) illustrated therein. It will be appreciated by those having ordinary skill in the art that the connections illustrated the figures are contemplated to potentially include methods, hardware, software, and/or other devices for establishing a communications link between the components, devices, systems, and/or entities, as may be utilized in implementation of the present embodiments. As such, the absence of component(s) and/or steps(s) from the figures should be not be interpreted as limiting the present embodiments to exclude additional component(s) and/or combination(s) of components. Moreover, though devices and components in the figures may be represented as singular devices and/or components, it will be appreciated that some embodiments can include a plurality of devices and/or components such that the figures should not be considered as limiting the number of devices and/or components.

It is noted that aspects of the present invention are described herein with reference to block diagrams and flowchart illustrations. However, it should be understood that each block of the block diagrams and/or flowchart illustrations can be implemented in the form of a computer program product, an entirely hardware embodiment, a combination of hardware and computer program products, and/or apparatus, systems, computing devices/entities, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code can be performed sequentially such that one instruction is retrieved, loaded, and executed at a time. In some embodiments, retrieval, loading, and/or execution can be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

Additionally, as should be appreciated, various embodiments of the present disclosure described herein can also be implemented as methods, apparatus, systems, computing devices/entities, computing entities, and/or the like. As such, embodiments of the present disclosure can take the form of an apparatus, system, computing device, computing entity, and/or the like executing instructions stored on a computer-readable storage medium to perform certain steps or operations. However, embodiments of the present disclosure can also take the form of an entirely hardware embodiment performing certain steps or operations.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A method for dynamically deactivating and reactivating cell sites based on a radar signal alert (RSA) broadcast, the method comprising:
receiving, at a first cell site, a first RSA broadcast from a second cell site, wherein the second cell site communicates the first RSA broadcast indicating the second cell site has detected a radar signal;
upon receiving, at the first cell site, a second RSA broadcast from a third cell site confirming the detected radar signal, determining a first time the radar signal will be within range of the first cell site;
at the determined first time, dynamically deactivating at least one antenna of the first cell site.

2. The method of claim 1, further comprising, prior to dynamically deactivating the at least one antenna of the first cell site, reducing transmitting power of the at least one antenna of the first cell site.

3. The method of claim 1, further comprising determining a second time the radar signal will no longer be within range of the first cell site.

4. The method of claim 3, further comprising, at the determined second time, dynamically reactivating the at least one antenna of the first cell site.

5. The method of claim 3, wherein determining the first time and the second time comprises:
identifying a sweeping pattern of the radar signal, a speed of the radar signal, and a time stamp corresponding to detection of the radar signal by each of the second cell site and the third cell site; and based on a location of the second cell site and the third cell site, determining the first time the radar signal will be within range of the first cell site and the second time the radar signal will no longer be within range of the first cell site.

6. The method of claim 1, wherein the at least one antenna of the first cell site provides Band 41 spectrum.

7. Non-transitory computer-readable storage media having computer-executable instructions embodied thereon that, when executed by one or more processors, cause the processors to:

receive, at a first cell site, a first RSA broadcast from a second cell site, the first RSA broadcast indicating the second cell site has detected a radar signal;

upon receiving the first RSA broadcast at the first cell site, determine a first time the radar signal will be within range of the first cell site;

at the determined first time, dynamically deactivate at least one antenna of the first cell site.

8. The non-transitory computer-readable storage media of claim 7, further comprising receiving a second RSA broadcast from a third cell site confirming the detected radar signal.

9. The non-transitory computer-readable storage media of claim 7, further comprising, prior to dynamically deactivating the at least one antenna of the first cell site, reducing transmitting power of the at least one antenna of the first cell site.

10. The non-transitory computer-readable storage media of claim 7, further comprising determining a second time the radar signal will no longer be within range of the first cell site.

11. The non-transitory computer-readable storage media of claim 7, further comprising, at the determined second time, dynamically reactivating the at least one antenna of the first cell site.

12. The non-transitory computer-readable storage media of claim 10, wherein determining the first time and the second time comprises identifying a sweeping pattern of the radar signal, a speed of the radar signal, and a time stamp corresponding to detection of the radar signal by the second cell site.

13. The non-transitory computer-readable storage media of claim 12, wherein determining the first time and the second time further comprises based on a location of the second cell site, determining the first time the radar signal will be within range of the first cell site and the second time the radar signal will no longer be within range of the first cell site.

14. The non-transitory computer-readable storage media of claim 7, wherein the at least one antenna of the first cell site provides Band 41 spectrum.

15. A system for dynamically deactivating and reactivating cell sites based on a radar signal alert (RSA) broadcast, the system comprising:

a first cell site comprising a first plurality of antennas, at least one antenna of the first plurality of antennas providing Band 41 spectrum, that, upon receiving a first RSA broadcast from a second cell site indicating the second cell site has detected a radar signal, determines a first time the radar signal will be within range of the first cell site and, at the determined first time, dynamically deactivates the at least one antenna; and the second cell site comprising a second plurality of antennas and a sensor that detects radar signals, wherein the second cell site communicates the first RSA broadcast to the first cell site indicating the second cell site has detected the radar signal.

16. The system of claim 15, wherein the system further comprises a third cell site that communicates a second RSA broadcast to the first cell site confirming the detected radar signal.

17. The system of claim 15, wherein the first cell site is further configured to, prior to dynamically deactivating the at least one antenna, reduce transmitting power for the at least one antenna.

18. The system of claim 15, wherein the first cell site further determines a second time the radar signal will no longer be within range.

19. The system of claim 15, wherein the first cell site further, at the determined second time, dynamically reactivates the at least one antenna.

20. The system of claim 15, wherein the first cell site further:

identifies a sweeping pattern of the radar signal, a speed of the radar signal, and a time stamp corresponding to detection of the radar signal by the second cell site; and based on a location of the second cell site, determines the first time the radar signal will be within range of the first cell site and the second time the radar signal will no longer be within range of the first cell site.

\* \* \* \* \*